United States Patent [19]

Lewis

[11] Patent Number: 4,947,722

[45] Date of Patent: Aug. 14, 1990

[54] MUSIC BOX ARRANGEMENTS FOR CAKES, TOYS, ORNAMENTS, AND THE LIKE

[76] Inventor: Fredric J. Lewis, 54 Hampden Rd., Rochester, N.Y. 14610

[21] Appl. No.: 356,341

[22] Filed: May 24, 1989

[51] Int. Cl.⁵ ............................................... G10F 1/06
[52] U.S. Cl. ......................................... 84/95.2; 428/7; 428/542.4
[58] Field of Search ............................ 84/94.2, 95.2; 428/7-11, 542.4; 229/2.5 R; D17/24

[56] References Cited

U.S. PATENT DOCUMENTS

| | | | |
|---|---|---|---|
| 2,807,118 | 9/1957 | Reuge | 84/95.2 X |
| 3,303,734 | 2/1967 | Reuge | 84/95.2 |
| 3,308,705 | 3/1967 | Shinnick | 84/95.2 |
| 3,511,433 | 5/1970 | Anderson et al. | 229/2.5 R |
| 3,843,220 | 10/1974 | Snider . | |
| 4,434,567 | 3/1984 | LeVeau | 84/94.2 X |
| 4,461,790 | 7/1984 | Snider | 428/7 |

OTHER PUBLICATIONS

Styrofoam Brand Insulation for Roofs, Walls, Foundations, 1989 Products and Specifications, Dow Chemical Co., 07200/DOT, Buyline 2930.
San Francisco Music Box Co., Autumn 1988, p. 10.
The Wilton Cake Catalog, 1979, p. 143.
Reuge Music Box Co., St. Croix, Switzerland, 1988, p. 14.
Splendid Music Box Co., 225 Fifth Ave. N.Y.C., 1988, p. 6.

*Primary Examiner*—Brian W. Brown
*Attorney, Agent, or Firm*—Bernard A. Chiama

[57] ABSTRACT

A novel cake layer is disclosed for use in a single or multi-layer cake arrangement of the type served at wedding receptions, anniversaries or other special occasions. The layer is a simulated cake layer made of plastic foam material sold under the trademark "STYROFOAM", and supporting a music box thereon actuable to play music when the lid of the layer is lifted. The layer is coated with real or permanent icing or frosting used for the cake arrangement so as to resemble a real cake layer in the arrangment. An engraved plate containing information as to the event being celebrated with the cake arrangement is applied to the inside of the layer thereby providing a long lasting token of remembrance for the recipients of the cake layer. The cake-top box may later be removed as a piece of the cake which may be saved as a symbol of the occasion to be remembered and enjoyed for many years.

5 Claims, 6 Drawing Sheets

MUSIC BOX ARRANGEMENTS FOR CAKES, TOYS, ORNAMENTS, AND THE LIKE

BACKGROUND OF THE INVENTION

The present invention relates generally to the application of music box or playing mechanisms to decorative keepsakes and more particularly to multi-layer cakes suitable for festive occasions such as weddings and anniversaries, and to other objects indicative of seasonal or joyous occasions.

There are many multi-layer cake arrangements designed for weddings which may comprise one or more layers of baked cake combined with one or more layers of simulated cake devices. These multi-layer cakes are generally adorned with an ornament such as wedding bells and/or figurines which are removed after the cake has been eaten and given to the bride as a keepsake.

It is also customary to utilize one of the simulated layers as a container for various edible articles such as doughnuts, cookies, or prizes. In these and other styles of cakes, elaborate decorations are added, such as colorful frosting, greetings indicative of the occasion, and various selections and arrangements of ornaments. However, these customary styles and cake arrangements lend themselves as only fleeting moments of remembrances. They provide a timely centerpiece for a special event with no lasting significance.

In the prior art, such as disclosed in U.S. Pat. No. 4,461,790, a simulated layer cake is utilized to contain a plurality of food items. Except for the figurines positioned atop the upper layer, there are no lasting remembrances for the bride to treasure since the entire structure is thrown away after only a single use. U.S. Pat. No. 3,843,220 discloses another arrangement of a simulated cake to which an ornamental piece is placed to indicate the occasion. As in the previously cited patent, the layers serve as containers for wrapped pieces of food articles, which when consumed, terminate the memory of the event. In U.S. Pat. No. 2,347,071, an artificial cake is disclosed as including simulated layers in the interest of economy for small weddings. A variety of ornamental devices are also illustrated, and perhaps these remain for the bride to treasure in later years. In the cakes and attendant devices disclosed in the foregoing patents, there are no special keepsakes which add special significance to the occasion being celebrated.

The cake decorator disclosed in U.S. Pat. No. 3,308,705 is interesting in regard to the use of a music box as a rotary centerpiece for a cake. A spike is used to support the music box after it is impaled onto a cake. The box itself sits atop the cake and also serves to support and rotate a decoration such as a shoe and candles. Once the box is removed, there is no lasting indication of its use.

Therefore, it is the principal object of the invention to enhance festive occasions which serve tailored or custom cake arrangements by providing or adding to mementoes derived from the cake arrangement.

Another object of the invention is to increase the significance manyfold for the meaning and remembrances derived from special-purpose cake arrangements at weddings and the like.

Still another object of the invention is to enhance the musical effects of music playing mechcanisms applied to toys and seasonal ornaments.

In one aspect, the invention was devised to overcome the lack of special significance and memories pointed out above with regard to large layer cakes by incorporating a music box or playing mechanism into one layer of a multi-layered cake. The layer containing the music box is made from synthetic resinous material being of rigid, plastic foam and having high compressive strength sold under the trademark "STYROFOAM", owned by the Dow Chemical Company material arranged to provide a sounding chamber for the mechanism and is specially devised with frosting and other cake decorations so that the music box or playing mechanism is out of sight. The layer however, is provided with a movable, preferably pivotal, cover or lid in order to permit entrance into the same. The cover also serves to support on its interior surface an engraved plate depicting the details of the occasion being celebrated with the cake. In addition, the interior of the box may be partially lined with velvet, or the like to enhance the box as a resting place for rings or other such tokens of the event. Upon lifting of the lid, the music box is activated to play one or more appropriate songs.

In another aspect of the invention, a music box or playing mechanism may be encased in a toy, an Easter egg, a Christmas ornament, an animal figurine, or the like. As in the arrangement for a cake, as discussed above, the music box mechanism is mounted in a box made of "STYROFOAM" plastic foam material. In its broadest aspect, the invention may comprise any sound producing device other than the music mechanism described above.

These and other objects will become apparent after reading the following description taken in conjunction with the accompanying drawings wherein:

DESCRIPTION OF THE PREFERRED EMBODIMENT

Figure 1:
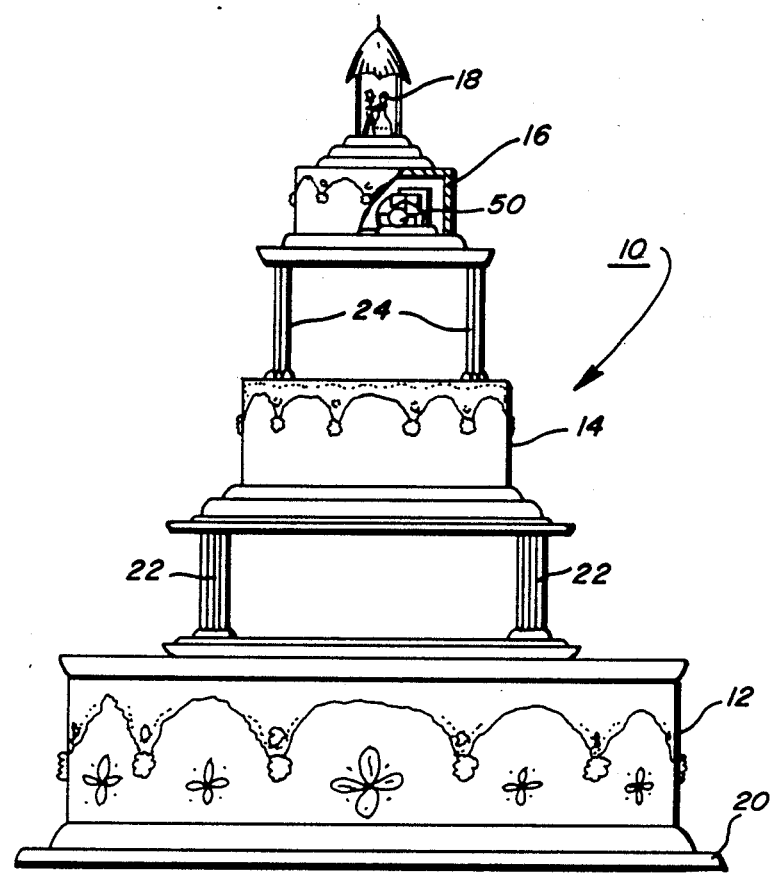
FIG. 1 is an elevational of a multi-layer cake to which the present invention is incorporated.

In FIG. 1, a wedding cake is shown generally indicated by the reference numeral 10 as comprising a main base layer 12, a mid-layer 14, and a top layer 16 upon which a wedding figurine 18 is placed as indicative of the occasion. It will be understood that while a wedding event is discussed herein, it is only for illustrative purposes and that any other event which includes a multi-layer cake arrangement as part of the celebration may utilize the present invention.

As is conventional in multi-layer cakes, the layers 12, 14, 16 and others, if larger cake arrangements are employed, ascend in decreasing sizes with the bottom layer 12 resting upon a base plate 20 suitably constructed so that the bottom layer may be cut into individual servings without damaging a table top.

The mid-layer 14 is centrally positioned on and above the top of the bottom layer by suitable decorative pillars 22. Similarly, the top layer 16 is positioned on and above the mid-layer by pillars 24. Each of the layers 12, 14, 16 are coated with cake icing or frosting, with attendant decorative frosting, so that the resultant cake is completely decorated in accordance with the occasion being celebrated with the cake as the central adornment. The present invention is also applicable to stacked layer cakes, or those multi-layer cakes which do not utilize pillars, or to a single layer cake equivalent to layer 16.

Figure 2:
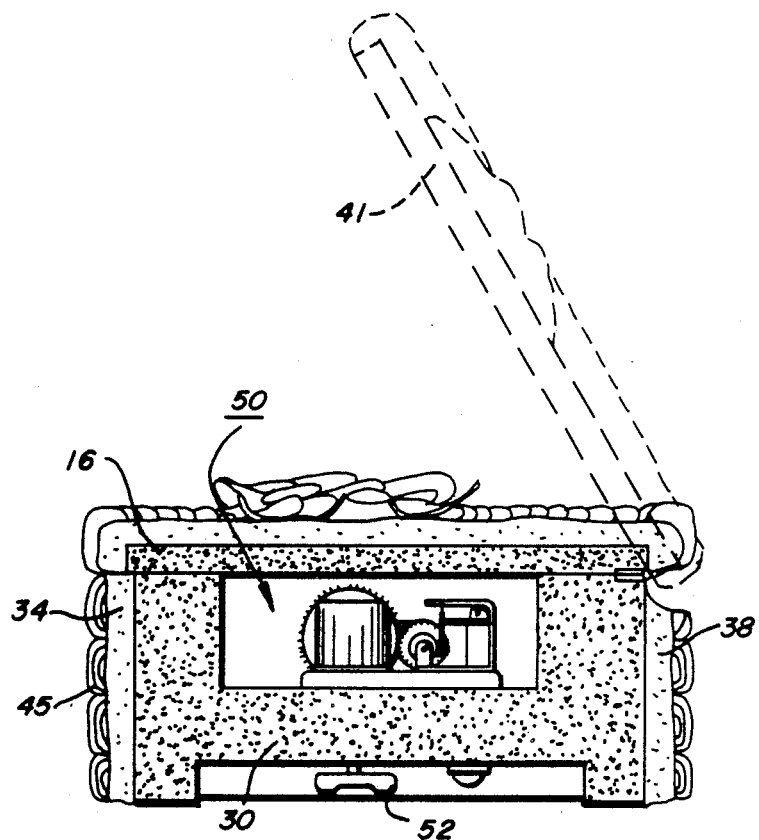
FIG. 2 is an elevational view of a music box enclosure as a layer of cake shown in FIG. 1 with the lid of the enclosure lifted.
Figure 3:
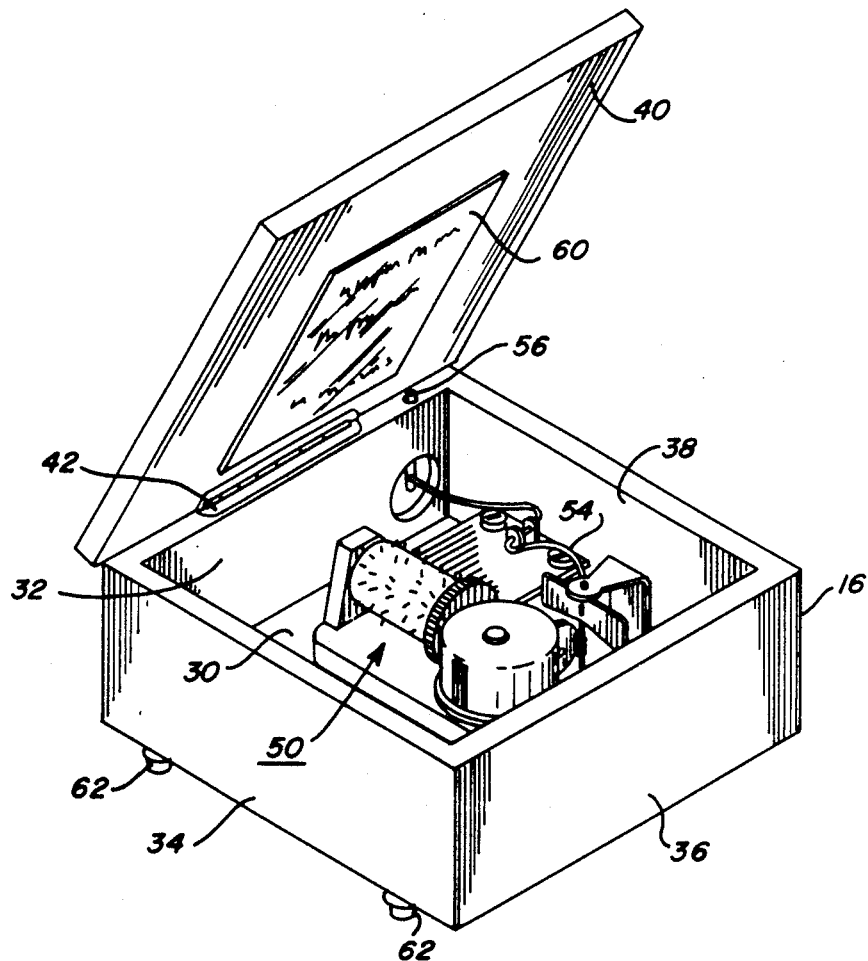
FIG. 3 is an isometric view of the enclosure showing the music box mechanism therein.

In accordance with the foregoing aspect of the present invention, the top most layer 16 is a simulated cake layer. As shown in FIGS. 2 and 3, the layer is an enclosure or box structure comprising a bottom wall 30, side walls 32, 34, 36, 38 and and a top wall 40, pivotally mounted by a hinge device 42 to the upper edge of the wall 32. The top wall 40 serves as a lid for the enclosure or box structure to expose the interior sound chamber thereof when pivoted upwardly to the dotted position at 41. As previously stated, the box-like layer 16 is fully and completely covered with cake icing or frosting 45 and other suitable cake decorations indicative of the event being celebrated. For example, weddings, birthdays, or anniversary greetings may be inscribed upon the top wall or box cover 40.

A music box or playing mechanism 50 is mounted within the box structure 16, preferably in one corner thereof. The winding key 52 for the mechanism is accessible from the bottom of the layer 16, and the actuator device 54, for activating and deactivating the operation of the music box mechanism, is actuable by means of a pin 56 slidably retained within the wall 32 and actuable by the opening and closing of the box cover or top wall 40. A single mechanism is shown for simplicity, but it is understood that two or three similar mechanisms may be included and arranged to operate in sequence or individually, selectively.

As shown in FIG. 3, the inside bottom surface of the top wall 40 supports a plate 60 having engraving thereon depicting the details of the occasion being remembered. For example, in the event of a wedding, the plate 60 may be engraved with the names of the bride and groom, the wedding date and place, and other words of endearment. It is envisioned by virtue of the present invention that on occasion for many years to come, the principal parties to the event will recall their memories by lifting the cover lid 40 to actuate the music box mechanism and visually scan once again the engraving on the plate 60. The music itself may be memorable in that the lyrics may have been specifically created for the parties involved.

The significant aspect of the invention is the preferred material for use in constructing the layer 16. It has been found that a sounding box for a music box mechanism made of "STYROFOAM" material offers more than expected high quality sound effects for the mechanism for the cost involved. "STYROFOAM" material is preferred not only because of the cost factor, but because the sound emanating from the music box mechanism and being reverberated by the "STYROFOAM" walls made of "STYROFOAM" material appears to provide better quality of music.

It has also been found that "STYROFOAM" material is particularly suited as a base to support conventional cake icing or frosting. The frictional surface characteristics and porous structure at and within the surface provide better holding capabilities for the frosting than available from smooth surfaces of other forms of layer construction. The superior holding ability is capable of holding frosting for extended periods of time and in spite of repeated rough handling of the layer.

Figure 4:
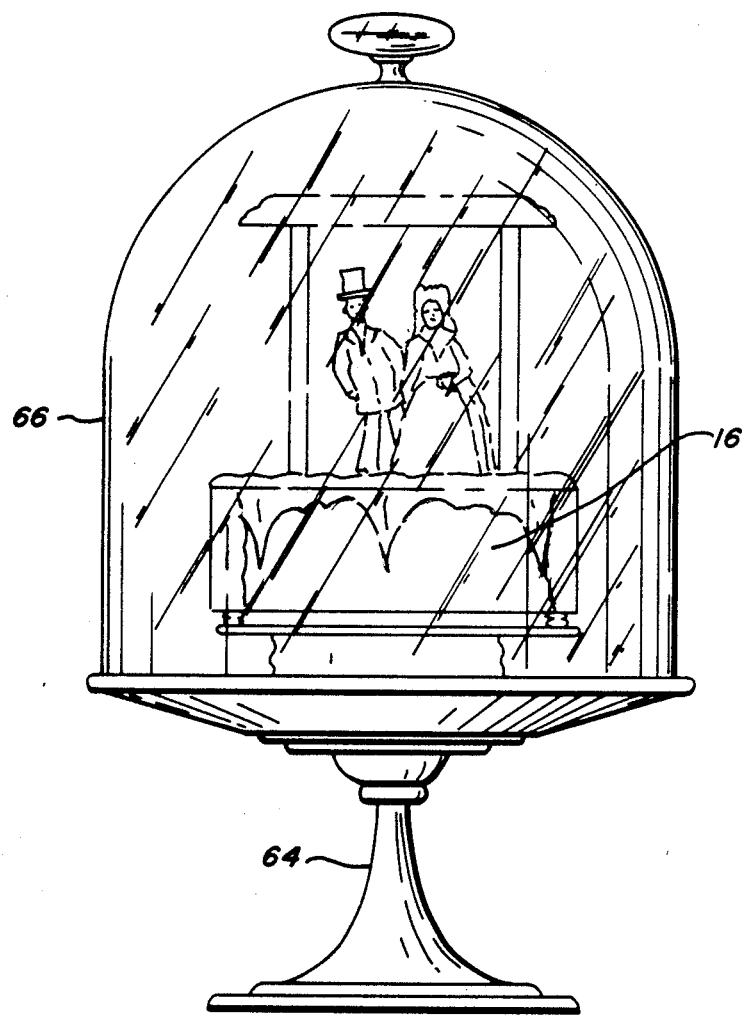
FIG. 4 is an elevational view of the music box layer encased in a glass-top cake dish for displaying the layer.

Short legs or foot members 62 may be secured to the bottom wall 30 to provide support and stability to the layer when on display or in storage. In the alternative, the layer 16 may be mounted on a rotary base and may assume various shapes such as a heart, or be of circular or oval shape. As shown in FIG. 4, the layer 16 is placed on an elevated cake dish 64 which also supports a glass or plastic cover 66 in the form of a bell jar. In this manner, the layer remains on display and is readily available for the bride and groom to renew the memories of the wedding.

From the foregoing it will be appreciated that the present invention provides a long lasting token of remembrances for the occasion with which it served as centerpiece. The music box mechanism may be arranged to play music conventional or customary for the occasion, or new music composed just for that occasion or for the parties to it. It will also be appreciated that the memento of the occasion will not spoil and may be decorated to match the host cake arrangement and thereby be hidden in the cake as a part thereof. The music box layer may be decorated by the baker or the parties to the event and can be marketed as a kit. As previously stated, two or three additional music box mechanisms may be included to play in sequence in a medley of tunes.

With the music box or playing mechanism 50 positioned on one side of the layer, as shown in FIG. 1, the mechanism may be suitably covered with a thin layer of "STYROFOAM" material or other material, and velvet material may be applied over the same and the interior surfaces of the wall sections. In this manner, the layer 16 may serve as a jewelry box for temporary or permanent storage of various articles presented at the event, such as wedding rings or bands, for which the cake was utilized.

Figure 5:
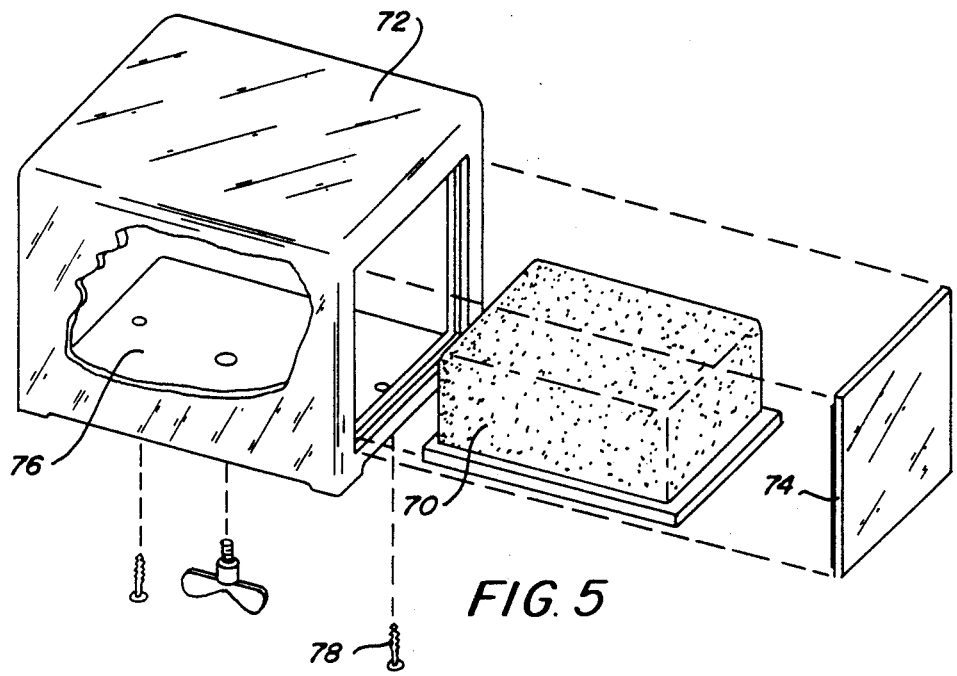
FIGS. 5-8 are isometric views of other forms of enclosures for a music box mechanism.

Many types of music box or playing mechanisms are encased in thin-wall, plastic covers, as illustrated by the numeral 70 in FIG. 5, which is an attempt by the manufacturer to protect the fine and delicate details of the mechanism. The present invention requires the use of a box made of "STYROFOAM" material to enclose the music box mechanism with or without the transparent cover since the musical quality resulting from the use of a box made of "STYROFOAM" material is greatly enhanced.

In FIG. 5, a music box mechanism with the transparent plastic cover 70 is adapted to be inserted into a box made of "STYROFOAM" material 72 by means of a side panel 74 of the box. This arrangement is an alternative to the pivotal top panel 40 as illustrated in FIG. 3. In this arrangement, a wooden base 76 may be used to support the mechanism and screws 78 utilized to secure the mechanism to the base within the enclosure.

Figure 6:
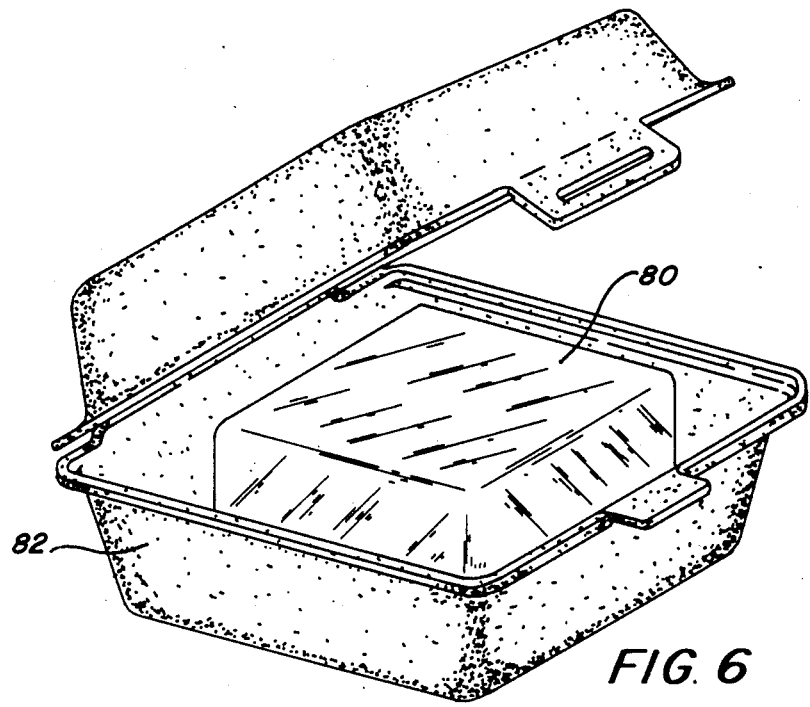
Figure 7:
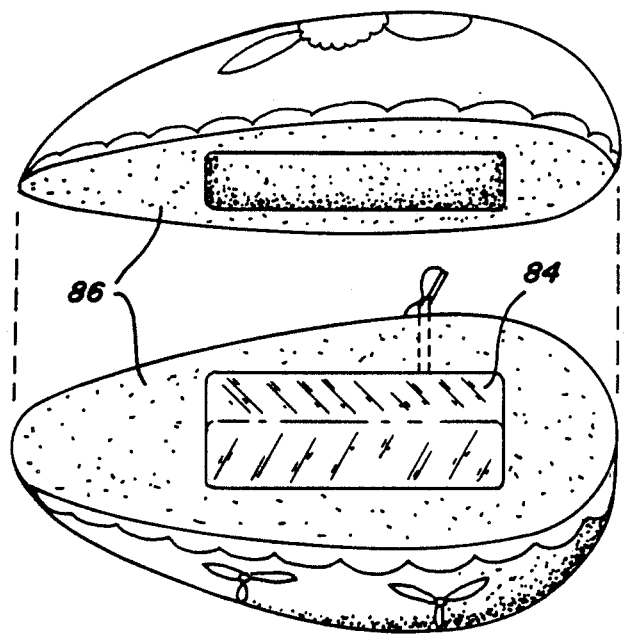
Figure 8:
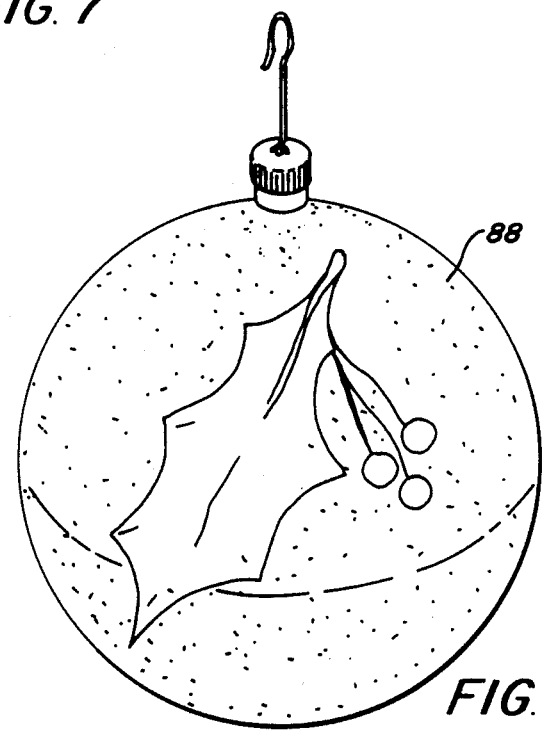

In FIGS. 6, 7 and 8, other shapes of styrofoam boxes or enclosures indicative of various applications of the invention are shown for enclosing a music box mechanism in accordance with the present invention. In FIG. 6, the music box mechanism 80 is shown in a box 82 "STYROFOAM" material of the type and shape used in fast food restaurants for containing hamburgers or other fast food sandwiches. Such application of the invention may be envisioned by fast food services for birthday celebrations wherein a box 82 containing a music playing mechanism may be devised for specific birthdays or other events.

In FIG. 7, a music box mechanism 84 is encased is a two-piece enclosure 86 "STYROFOAM" material formed in the shape of an Easter egg. Another aesthetic form the present invention might take, illustrated in FIG. 8, is a Christmas tree ornament having an outer two-piece enclosure 88 made of "STYROFOAM" material for a music box mechanism contained therein. Similarly, toys may be made to incorporate enclosure made of "STYROFOAM" material for a music box mechanism, thereby enhancing the occasion for which the toy was presented.

It will be appreciated that the foregoing variations in the host device for enclosure made of "STYROFOAM" material, be it a fast food dispensing container for a gift, an Easter egg, a Christmas tree ornament, toys, a Valentine's Day gift candy box, or any other form to denote a memorable occasion, the styrofoam enclosure with the music box mechanism may be removed and cherished with music for many years thereafter. The enclosure with or without any permanent form of appropriate decorative material, such as frosting, seasonal wrappings or coatings, if such has been applied, may be reused over and over or even modified to permit its use in other host devices.

What is claimed is:

1. A music box arrangement comprising a rigid enclosure structure having side wall sections defining a sound chamber, at least one music playing mechanism mounted within said chamber and being adapted to produce musical sounds therein, said mechanism being arranged to direct said musical sounds to the inner surfaces of said wall sections without intervening objects therebetween, said wall sections being formed of "STYROFOAM" material for enhancing the sound quality of the musical sounds.

2. The music box arrangement of claim 1 wherein said enclosure structure includes two cooperating portions which are arranged to be joined together to define said sound chamber.

3. A music box or playing arrangement comprising an enclosed structure defining interior top, bottom and side walls, one of side wall being movably mounted relative to the other of said walls thereby exposing the interior of said structure when said one wall is moved, at least one music box or playing mechanism mounted within said enclosure structure for producing musical sounds therein, said top, side and bottom walls being made from "STRYOFOAM" material as the sounding box for said music box or playing mechanism, for enhancing the sound quality of the musical sounds, said inner walls being arranged to receive said musical sounds directly thereon.

4. A simulated cake layer devised for use on a cake to celebrate an event, the cake having one or a plurality of layers, comprising a removably detachable enclosure structure having side, bottom and top wall sections, at least one music box mechanism mounted within said enclosure structure and being arranged for operation upon movement of an actuator member, said top and side wall sections being coated with decorative frosting to simulate a real cake layer, said side wall sections are made of "STYROFOAM" material as the sounding container for said music box mechanism and being arranged to receive the musical sounds directly from said mechanism for enhancing the sound quality of the musical sounds.

5. The simulated cake layer as defined in claim 4 wherein said top wall section is made of "STYROFOAM" material.

* * * * *